UNITED STATES PATENT OFFICE.

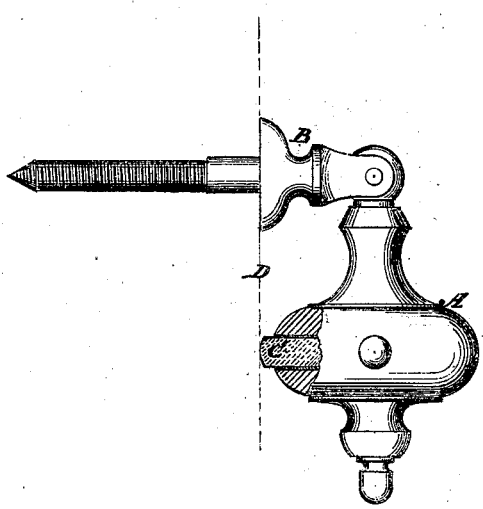

CHARLES H. PIERPENT, OF WEST MERIDEN, CONNECTICUT, ASSIGNOR TO HIMSELF AND P. J. CLARK, OF SAME PLACE.

IMPROVEMENT IN DRAWER-PULLS.

Specification forming part of Letters Patent No. 111,243, dated January 24, 1871.

*To all whom it may concern:*

Be it known that I, CHARLES H. PIERPENT, of West Meriden, in the county of New Haven and State of Connecticut, have invented a new and Improved Drawer-Pull; and I do hereby declare that the following is a full, clear, and exact description thereof, which will enable others skilled in the art to make and use the same, reference being had to the accompanying drawing, forming part of this specification.

This invention relates to improvements in that class of drawer-pulls in which a handle is jointed to a shank projecting from the front of the drawer, to hang in a vertical position when not used for pulling the drawer; and it consists in the application to the said handle of a cushion, of india-rubber or other suitable elastic substance, in the part likely to strike against the said drawer-front when let fall, to prevent marring or defacing the front, also to prevent noise.

The drawing represents a side elevation of my improved drawer-pull, a part of the knob being broken out to show the application of the cushion or spring.

A is the handle, and B the shank to which it is pivoted. C is the cushion, of india-rubber or other substance, applied to the side of the handle, which strikes against the drawer-front when let fall, which is represented in this example by the line D. The said cushion may be of any kind or form, and it may be applied in any approved way.

Having thus described my invention, I claim as new and desire to secure by Letters Patent—

The handle A of a drawer-pull, jointed to the drawer or a shank projecting therefrom, so as to swing downward when let go from the hand, provided with a spring or cushion, C, substantially as specified.

CHARLES H. PIERPENT.

Witnesses:
COOKE LOUNSBURY,
JARED LEWIS.